United States Patent
Halford et al.

(10) Patent No.: US 7,369,485 B2
(45) Date of Patent: May 6, 2008

(54) WIRELESS RECEIVER FOR SORTING PACKETS

(75) Inventors: Steven D. Halford, Palm Bay, FL (US); Perry W. Frogge, Palm Bay, FL (US)

(73) Assignee: Conexant, Inc., Red Bank, NJ (US)

( * ) Notice: Subject to any disclaimer, the term of this patent is extended or adjusted under 35 U.S.C. 154(b) by 1117 days.

(21) Appl. No.: 10/324,218

(22) Filed: Dec. 19, 2002

(65) Prior Publication Data

US 2004/0032825 A1    Feb. 19, 2004

Related U.S. Application Data

(60) Provisional application No. 60/404,647, filed on Aug. 19, 2002.

(51) Int. Cl.
*H04J 11/00*    (2006.01)
*H04B 7/00*    (2006.01)

(52) U.S. Cl. .................. 370/208; 370/203; 370/342; 370/343; 370/345; 455/502; 455/509

(58) Field of Classification Search ........ 370/203–208, 370/324, 338, 342–345, 310, 319, 436, 478, 370/329, 481; 455/500–510
See application file for complete search history.

(56) References Cited

U.S. PATENT DOCUMENTS

| | | | |
|---|---|---|---|
| 6,351,499 B1 * | 2/2002 | Paulraj et al. | 375/267 |
| 6,370,160 B1 * | 4/2002 | Knutson et al. | 370/503 |
| 6,687,492 B1 * | 2/2004 | Sugar et al. | 455/276.1 |
| 6,807,241 B1 * | 10/2004 | Milbar et al. | 375/343 |

(Continued)

FOREIGN PATENT DOCUMENTS

EP    0 727 885 A    8/1996

(Continued)

OTHER PUBLICATIONS

Halford S et al: "OFDM as a High Rate Extension to the CCK-based 802.11b Standard" IEEE.802.11-01/154, Mar. 2001, pp. 1-35, XP002240126.

(Continued)

*Primary Examiner*—Edan Orgad
*Assistant Examiner*—Venkatesh Haliyur
(74) *Attorney, Agent, or Firm*—Thomas, Kayden, Horstemeyer & Risley, LLP (57) ABSTRACT

A wireless receiver that sorts packets including a packet detector, multiple correlators, and multiple packet processors. Each correlator correlates a received signal according to packet type. Each packet processor processes the received signal according to packet type. A signal power detector may be provided to initially qualify the received signal as containing a packet, and the correlators determine whether a packet is present. The correlators may be configured for sequential or simultaneous correlation. For the simultaneous correlator configuration, a correlation monitor is provided to monitor correlation results to determine if the received signal contains a packet, and if so, to determine packet type. A low SNR packet detector may be provided which correlates the received signal to detect weak packet signals. The signal power detector may be omitted, where the correlators simultaneously monitor the received signal while a correlation monitor continuously monitors correlation results for packet detection.

10 Claims, 6 Drawing Sheets

U.S. PATENT DOCUMENTS

| | | | |
|---|---|---|---|
| 6,987,752 B1 * | 1/2006 | Sarraf et al. | 370/343 |
| 7,031,371 B1 * | 4/2006 | Lakkis | 375/146 |
| 7,054,296 B1 * | 5/2006 | Sorrells et al. | 370/338 |
| 7,072,390 B1 * | 7/2006 | Sorrells et al. | 375/222 |
| 7,149,474 B1 * | 12/2006 | Mikhak | 455/41.2 |
| 7,177,376 B2 * | 2/2007 | Atungsiri et al. | 375/343 |
| 2002/0042256 A1 * | 4/2002 | Baldwin et al. | 455/232.1 |
| 2003/0072284 A1 * | 4/2003 | Webster et al. | 370/335 |
| 2004/0101068 A1 * | 5/2004 | Wang et al. | 375/324 |
| 2004/0202133 A1 * | 10/2004 | Filipovic | 370/332 |
| 2005/0130687 A1 * | 6/2005 | Filipovic et al. | 455/522 |

FOREIGN PATENT DOCUMENTS

JP        0727885 A2 *  8/1996

OTHER PUBLICATIONS

PCT Notification of Transmittal of the International Search Report or the Declaration, dated Jan. 2, 2004, 5 pages.

* cited by examiner

WIRELESS RECEIVER FOR SORTING PACKETS

CROSS-REFERENCE TO RELATED APPLICATION(S)

The present application is based on U.S. Provisional Patent Application entitled "Packet Sorting Algorithms", Ser. No. 60/404,647, filed Aug. 19, 2002, which is hereby incorporated by reference in its entirety.

FIELD OF THE INVENTION

The present invention relates to wireless communications, and more particularly to a wireless receiver packet that sorts from among different packet types in a received signal.

BACKGROUND OF THE INVENTION

The Institute of Electrical and Electronics Engineers, Inc. (IEEE) 802.11 standard is a family of standards for wireless local area networks (WLAN) in the unlicensed 2.4 and 5 Gigahertz (GHz) bands. The current IEEE 802.11b standard (also known as "Wi-Fi") defines various data rates in the 2.4 GHz band, including data rates of 1, 2, 5.5 and 11 Megabits per second (Mbps). The 802.11b standard defines single-carrier packets using a serial modulation technique and direct sequence spread spectrum (DSSS) with a chip rate of 11 Megahertz (MHz). The IEEE 802.11a standard defines multi-carrier packets with data rates of 6, 12, 18, 24, 36 and 54 Mbps in the 5 GHz band using an orthogonal frequency division multiplexing (OFDM) encoding method. It is noted that systems implemented strictly according to either the 802.11a standard or the 802.11b standard are incompatible and not designed to work together.

A new IEEE standard is being proposed, referred to as 802.11g (the "802.11g proposal"), which is a high data rate extension of the 802.11b standard at 2.4 GHz. It is noted that, at the time of this disclosure, 802.11g is only a draft standard and is not yet a completely approved standard. It is desired that 802.11 g devices be backwards compatible with 802.11b devices and operate in the 2.4 GHz band. In accordance with a current draft of the 802.11g standard, in fact, 802.11g devices should be configured to fully support communications according to 802.11b and be able to communicate at any of the standard 802.11b rates. It is also desired, however, that the 802.11g devices be able to communicate at higher data rates, such as the same data rates supported by the 802.11a standard. The higher data rates are achieved by borrowing encoding and modulation techniques of 802.11a and applying them in the 2.4 GHz band. The current 802.11g standard includes several higher data rate modes, including a mandatory mode and two optional modes. The mandatory mode employs 802.11a-type packets using OFDM in the 2.4 GHz band. The first optional mode employs mixed-mode packets with legacy CCK preambles followed by OFDM payloads. The second optional mode employs an extension of the Packet Binary Convolutional Coding (PBCC) optional mode of the 802.11b standard using 8PSK (8 Phase Shift Keying) to achieve a higher raw data rate of 22 Mbps.

It is appreciated that a significant technical challenge is presented for 802.11g devices in that they should be configured to detect and acquire different types of packets received in the same radio frequency (RF) band, possibly within the same WLAN. The general 802.11 packet format includes a packet preamble, which is followed by a packet header, which is followed by a packet payload, which may be followed by a packet tail. The packet payload includes packet user information or user data. The packet tail includes packet end signaling, such as pad bits, flush bits, SIFs extension, etc. The 802.11g receivers, however, do not have prior knowledge of which packet-type is being received. The encoding and modulation varies with packet-type and even within a packet depending upon the packet-type. The preamble and header portions vary depending upon packet-type. The signal to noise ratio (SNR) of transmitted packets may vary significantly. To complicate matters, the target 2.4 GHz band may be occupied by non-802.11 sources of interference, such as, for example, microwave ovens, Bluetooth devices, and other interference sources. Each receiver is tasked to detect both weak and strong signals, to distinguish and to decipher the packet-type during the time period of the packet preamble and/or header and before the beginning of the user information in the packet payload of each packet.

Although the present invention is described with reference to the 802.11 standards, the present invention is not limited to 802.11 and applies to any system employing different packet types occupying the same RF band, including, for example, wireless systems using both single-carrier and multi-carrier modulation schemes. It is desired to provide a wireless receiver that detects a packet in a received signal and that determines the packet type before the start of information contained within the packet, such as within the header. It is also desired that the receiver be able to detect signals of varying strength (from weak to strong) and to avoid false detections given other interference sources. It is further desired to use a minimum amount of signal processing circuits and to minimize or otherwise eliminate additional power consumption.

SUMMARY OF THE INVENTION

A wireless receiver for sorting packets according to an embodiment of the present invention includes a multi-carrier correlator, a multi-carrier packet processor, a single-carrier correlator and a single-carrier packet processor. The multi-carrier correlator correlates a received signal according to characteristics of a multi-carrier signal and the single-carrier correlator correlates the received signal according to characteristics of a single-carrier signal. The multi-carrier packet processor processes the received signal if the multi-carrier correlator indicates a multi-carrier packet and the single-carrier packet processor processes the received signal if the single-carrier correlator indicates a single-carrier packet. A signal power detector may be provided to monitor the power level of the received signal to initially detect a possible packet. In this manner, the correlators may remain in low-power mode until the power level of the received signal indicates a potential packet, although weak or low SNR signals may be missed. In another embodiment, a low SNR single-carrier packet detector is provided to monitor the received signal to detect weak single-carrier packets.

The correlators may be configured for sequential or simultaneous correlation. In one embodiment, the signal power detector is not provided and the correlators simultaneously and continuously monitor the received signal. The correlation monitor continuously monitors correlation results until a packet is detected. Weak packet signals are more likely to be detected, although a greater level of power is consumed to continuously operate the correlators.

A wireless receiver that sorts packets in a received signal according to another embodiment of the present invention includes at least one packet detector, a plurality of correlators, and a plurality of packet processors. Each correlator correlates the received signal according to a corresponding one of a plurality of packet types. Each packet processor processes the received signal according to one of the plurality of packet types. In one embodiment, a signal power detector is provided to initially qualify the received signal as containing a packet, and the correlators make the final determination of whether a packet is present. The correlators may be configured for sequential or simultaneous correlation. In the simultaneous correlator configuration, a correlation monitor is provided to monitor correlation results to determine if the received signal contains a packet, and if so, to determine packet type. A low SNR packet detector may be provided which correlates the received signal to detect weak packet signals. In an alternative embodiment, the signal power detector is omitted and the correlators simultaneously monitor the received signal. In this case, the correlation monitor serves as a packet detector.

A method of sorting packet types in a selected RF band according to an embodiment of the present invention includes correlating a received signal according to a plurality of different packet types, determining packet presence and packet type based on correlation results, and processing the received signal according to a determined packet type if a packet signal is present. The method may include simultaneously correlating the received signal for each of the different packet types and continuously monitoring correlation results. The method may include monitoring power level of the received signal to detect possible presence of a packet, and either sequentially or simultaneously correlating for each packet type.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF
EMBODIMENT(S) OF THE INVENTION

Figure 1:
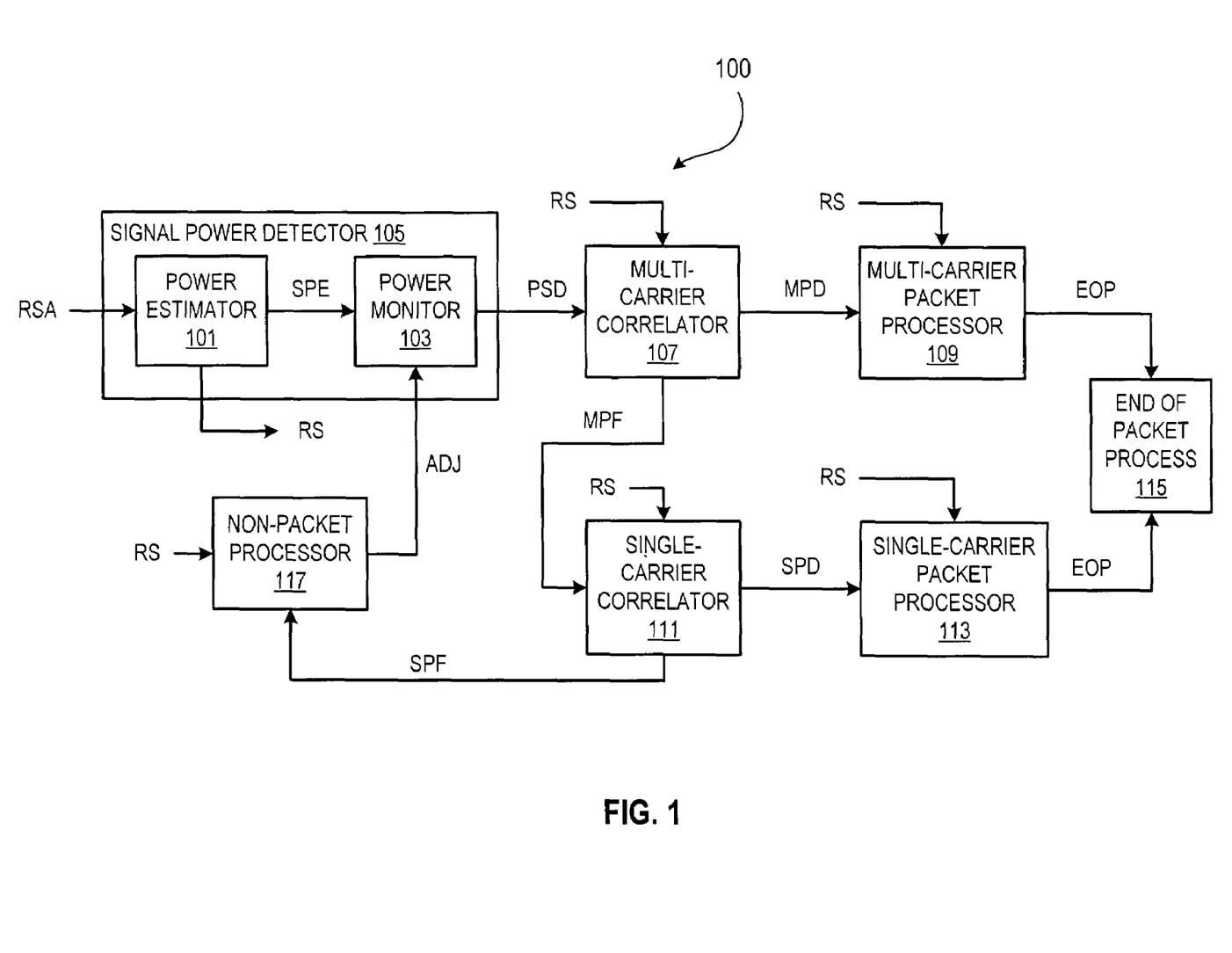
FIG. 1 is a simplified block diagram of a wireless receiver implemented according to one embodiment of the present invention including packet detection based on signal power and sequential correlation.

FIG. 1 is a simplified block diagram of a wireless receiver 100 implemented according to one embodiment of the present invention including packet detection based on signal power and sequential correlation. The wireless receiver 100 includes a signal power detector 105, which monitors the power level of a received signal to detect possible transmission of a packet. The received signal is initially provided in analog format "RSA" and is converted to digital format "RS". Although not shown, the wireless receiver 100 includes an antenna and radio that monitors a wireless medium for transmissions of packet signals in one or more selected radio frequency (RF) bands of communication, such as, for example, 2.4 gigahertz (GHz), 5 GHz, etc. The radio down-converts RF signals to baseband signals, either directly (direct conversion) or through one or more intermediate frequency (IF) levels. A significant increase in power level of the received signal indicates the possibility of transmission of a packet by another wireless device. As previously described, however, a power level increase of the received signal may be due to one or more interfering sources rather than a legitimate packet signal.

The signal power detector 105 includes a power estimator 101 and a power monitor 103. As described further below, the power estimator 101 includes an analog to digital converter (ADC) 503 (FIG. 5) that converts the analog RSA signal to the digital RS signal. The term "received signal" as used herein refers to either or both of the RSA and RS signals depending upon context. The power estimator 101 measures the power level of both of the RSA and RS signals and provides signal power estimation (SPE) information to the power monitor 103. The SPE information includes power estimations of the analog and digital signals, as further described below. The power monitor 103 makes a determination of packet presence based on the SPE information. In one embodiment, for example, a significant change in power level of the received signal greater than at least one predetermined threshold indicates the presence of a packet. Different thresholds may be employed for the RSA and RS signals. The thresholds may be defined as differential power levels indicative of a power level increase above the noise floor level or existing power level measured in the wireless medium just prior to signal onset, although absolute power level thresholds are also contemplated.

The signal power detector 105 performs any suitable process that forms an estimate of the power level of the received signal and uses the relative power level or power level change to detect the possible presence of a transmitted packet. It is desired to detect both strong and weak packet signals while reducing or otherwise eliminating false detections. The threshold(s) should be chosen to minimize false detections, to minimize the number of missed packets, and to maximize detection of valid packets. The signal power detector 105 may be implemented in analog, in digital, or any combination of both analog and digital. The power determination process can be either single-stage or a multi-stage power estimation process. For example, long term power averages and/or short term power averages may be employed to detect power level changes used to detect a packet.

If the power monitor 103 detects a significant power level change of the received signal sufficient to indicate the possible presence of a packet, it asserts a packet signal detect (PSD) signal. The PSD signal is provided to a multi-carrier correlator 107, which processes the RS signal upon assertion of the PSD signal to determine if a multi-carrier packet is contained in the received signal. It is noted that although the signal power detector 105 may use both the analog and digital versions of the received signal to detect a packet, automatic gain control (AGC) functions (not shown) control signal level power to within the range of the ADC 503. Also, the correlation processing described herein is a digital process operative on the digital RS signal. In one embodiment, the multi-carrier correlator 107 is powered up and in an idle mode or low power mode or the like in which it consumes little or no power until activated by assertion of the PSD signal. For example, the clock signals provided to the multi-carrier correlator 107 are switched off or otherwise operated in a low frequency during the idle mode. The multi-carrier correlator 107 employs any acceptable method that reliably detects the expected type of multi-carrier packet. In one particular embodiment, the multi-carrier correlator 107 correlates for 802.11g or 802.11a packets employing OFDM, which have several key characteristics that may be used for identification. An OFDM 802.11g or 802.11a packet includes two equal length preamble portions, including a Short Sync Field with ten short syncs of approximately 0.8 microseconds (μs) each, followed by a Long Sync Field with two long syncs of approximately 4.0 μs each. OFDM packets can be detected by correlating for the short syncs, for the long syncs, or for a combination of both. In one embodiment, the multi-carrier correlator 107 is an OFDM correlator that correlates for a long sync and times out if not discovered within a predetermined period of time from when the PSD signal was asserted, such as approximately 12 μs. Following the sync fields is a signal field containing packet header information. If the packet is determined to be an OFDM packet, it is desired that the determination be made at or before the beginning of the packet header to avoid losing packet information.

If the multi-carrier correlator 107 detects a multi-carrier packet, then it asserts a multi-carrier packet detect (MPD) signal to a corresponding multi-carrier packet processor 109. In one embodiment, the multi-carrier packet processor 109 is in an idle mode in a similar manner as described above for the multi-carrier correlator 107, in which it consumes little or no power until activated by assertion of the MPD signal. Upon assertion of the MPD signal, the multi-carrier packet processor 109 begins processing the RS signal to demodulate and acquire a multi-carrier packet. For example, if the packet type is OFDM, the multi-carrier packet processor 109 begins processing the RS signal according to OFDM as known to those skilled in the art.

If the multi-carrier correlator 107 makes the determination that the RS signal does not contain a multi-carrier packet, then it asserts a multi-carrier packet fail (MPF) signal to a single-carrier correlator 111. The single-carrier correlator 111 employs any acceptable method that reliably detects the expected type of single-carrier packet. In one particular embodiment, the single-carrier correlator 111 correlates for 802.11b-type packets having a preamble consisting of modulated Barker words followed by a known Sync Field Delimiter (SFD) sequence. In one embodiment for 802.11b-type packets, as further described below, a two stage process is employed including Barker correlation (with modulation removed) to initially qualify the packet as a single-carrier packet followed by signal acquisition and SFD sequence search. The packet is declared to be a valid 802.11b-type packet upon detection of the SFD sequence. In one embodiment, the single-carrier correlator 111 is an 802.11b correlator that correlates for Barker words and times out if not discovered within a predetermined period of time from when the MPF signal was asserted.

If the single-carrier correlator 111 makes the determination that the signal contains a single-carrier packet, it asserts a single-carrier packet detect (SPD) signal to a single carrier packet processor 113. Upon assertion of the SPD signal, the single-carrier packet processor 113 begins processing the RS signal to demodulate a single-carrier packet. For example, if the packet type is an 802.11b-type packet with a Barker preamble and a CCK-modulated payload, the single-carrier packet processor 113 demodulates the RS signal according to 802.11b as known to those skilled in the art. In one embodiment, the single-carrier packet processor 113 is implemented with a low power idle mode in which it is activated to begin processing the RS signal upon assertion of the SPD signal.

If the single-carrier correlator 111 makes the determination that the RS signal does not contain a single-carrier packet, then it asserts a single-carrier detect fail (SDF) signal to a non-packet processor 117. The non-packet processor 117 receives and processes the RS signal to potentially change the behavior of the wireless receiver 100 in an attempt to reduce false packet detections. Recall that the signal power detector 105 asserted the PSD signal indicating a potential packet signal, but that the correlators 107 and 111 were unable to detect a valid packet in the RS signal. For example, the non-packet processor 117 may change (e.g., increase) the threshold power level(s) or power differential(s) used by the signal power detector 105 for packet detection as illustrated by adjust (ADJ) signals provided to the power monitor 103.

After processing a packet by either the multi-carrier packet processor 109 or the single-carrier packet processor 113, an end of packet process 115 is performed at the end of the packet and prior to the beginning of a search of the next packet. The end of packet process 115 may include, but not be limited to, several functions executed prior to beginning a search for the next packet, such as, for example, re-estimating ambient noise floor or resetting automatic gain control (AGC) settings.

The wireless receiver 100 provides a relatively low power approach. The correlators 107, 111 and the processors 109, 113 consume larger amounts of power when active, but remain in a low power or idle mode until needed. The wireless receiver 100 employs the signal power detector 105 to initially determine whether the received signal may contain a valid packet based on signal power alone. If a possible packet is indicated by signal power, only then is the multi-carrier correlator 107 activated to first determine if the RS signal contains a multi-carrier packet. If so, then the multi-carrier processor 109 is made active. If not, then the multi-carrier correlator 107 is de-activated and the single carrier correlator 111 is activated to process the RS signal to determine the presence of a single-carrier packet. If so, then the single-carrier processor 113 is made active. In this manner, the correlators 107, 111 are active only if the signal power detector 105 indicates a possible packet signal, and then the correlators 107, 111 are used sequentially or one at a time to determine packet type.

Since the wireless receiver 100 uses the signal power detector 105 to initially qualify a signal, very weak signals might not be detected on the basis of power level alone. The signal power detector 105 may rely on one or more given thresholds that are set at arbitrary levels to minimize false detections, and which may be set too high to detect weak signals (and which may be modified over time). Also, the wireless receiver 100 performs sequential correlation in which multi-carrier correlation is conducted first followed by single-carrier correlation. So, if the RS signal contains a single-carrier packet, single-carrier correlation does not begin until later in the packet resulting in less than optimal design for detecting and processing single-carrier packets.

The wireless receiver 100 illustrated includes a multi-carrier correlator 107 for detecting a multi-carrier packet and a single-carrier correlator 111 for detecting a single-carrier packet. The present invention, however, is applicable to any number of packet types received in a selected RF band including multiple single-carrier packets (an no multi-carrier packets), multiple multi-carrier packets (an no single-carrier packets), or any combination thereof. For example, two or more different single-carrier packet types or two or more multi-carrier packet types are contemplated. The sequential ordering of the correlators depends upon the particular packet types for a particular implementation to ensure successful correlation results. In a specific embodiment in which the multi-carrier correlator 107 is OFDM and the single-carrier correlator 111 is an 802.11b correlator, the OFDM correlator is placed first in the sequential ordering since OFDM preambles are significantly shorter than the preambles for 802.11b-type packets. By the time sufficient correlation results are completed to determine that the packet is not an 802.11b-type packet, it would be too late to attempt correlation for OFDM. In contrast, an OFDM correlator can determine that the packet is not OFDM and leave sufficient time for the 802.11b-type correlator to begin correlation and determine whether the RS signal contains an 802.11b-type packet.

Figure 2:
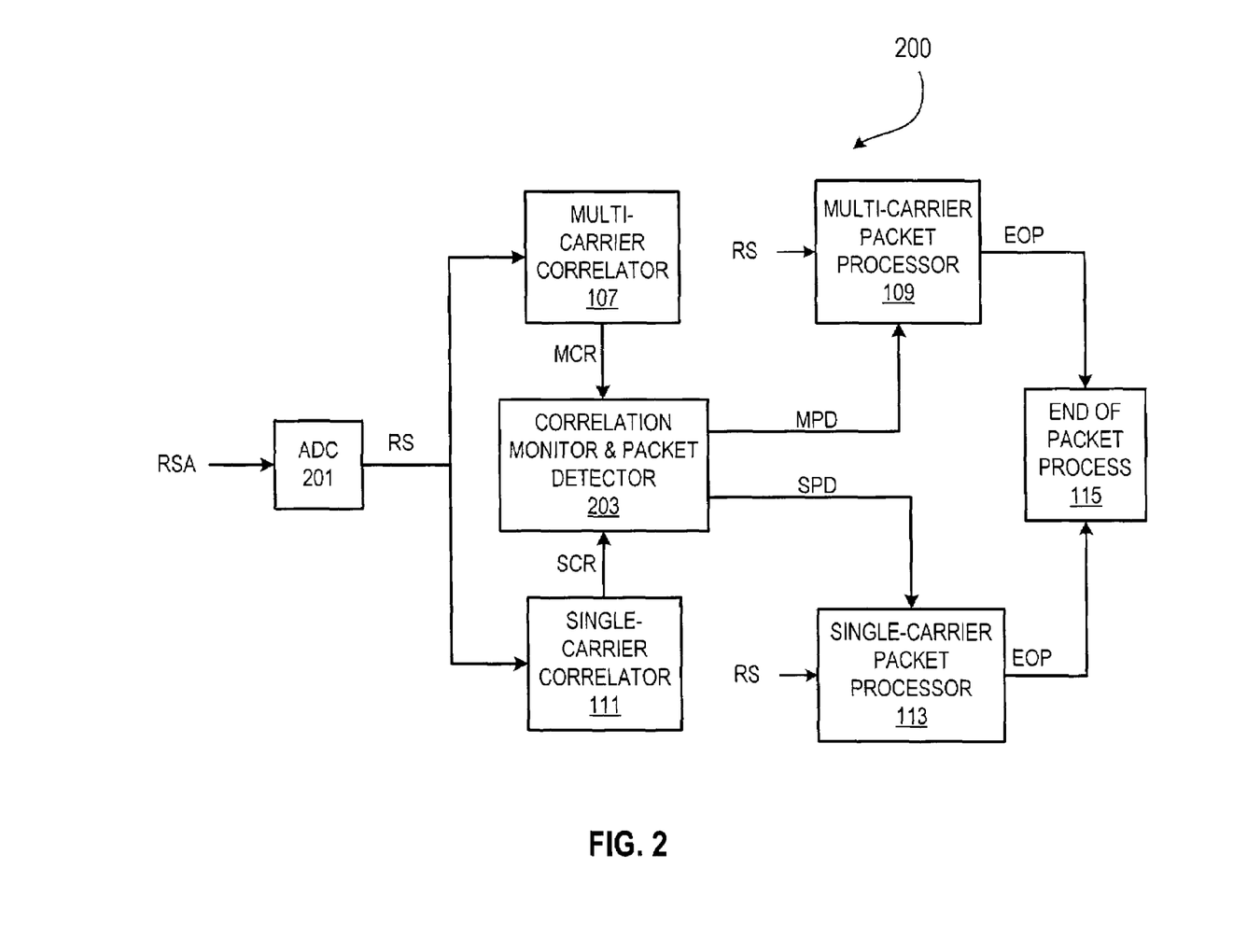
FIG. 2 is a simplified block diagram of a wireless receiver implemented according to another embodiment of the present invention using simultaneous correlation for packet detection.

FIG. 2 is a simplified block diagram of a wireless receiver 200 implemented according to another embodiment of the present invention using simultaneous correlation for packet detection. Similar components of the wireless receiver 100 assume identical reference numerals. For the wireless receiver 200, an ADC converts the RSA signal to digital format, and the RS signal is provided to the multi-carrier correlator 107 and the single-carrier correlator 111 simultaneously. The signal power detector 105 is eliminated and the correlators 107 and 111 remain powered on and active during normal operation. The correlators 107, 111 for the wireless receiver 200 may or may not use time-out periods but instead continuously monitor the RS signal and provide correlation results. The processors 109 and 113 and the end of packet process 115 are included and configured in substantially the same manner and are not further described.

A correlation monitor and packet detector 203 is coupled to the correlators 107 and 111 to monitor correlation results and determine packet type. The correlation monitor and packet detector 203 is continuously active and monitors a set of multi-carrier correlation result (MCR) signals from the correlator 107 and a set of single-carrier correction result (SCR) signals from the single-carrier correlator 111. The MCR signals may include the MPD signal and the SCR signals may include the SPD signal, each indicative of successful correlation for the corresponding packet type. If the correlator 107 detects a multi-carrier packet, then the correlation monitor and packet detector 203 asserts or otherwise forwards the MPD signal (or a version thereof) to the processor 109 for processing a multi-carrier packet. If the single-carrier correlator 111 detects a single-carrier packet, then the correlation monitor and packet detector 203 asserts or otherwise forwards the SPD signal (or a version thereof) to the processor 113 for processing a single-carrier packet. If both correlators 107 and 111 detect a corresponding signal type, then the correlation monitor and packet detector 203 bases the packet-type decision on other characteristics or in another manner, such as, for example, the largest correlation results. Alternatively, positive correlation results from one correlator may be favored over the other. For example, in one embodiment, if the multi-carrier correlator 107 indicates a multi-carrier packet, the SCR signals from the single-carrier correlator 111 are ignored and a multi-carrier packet is assumed regardless of whether the single-carrier correlator 111 indicates a single-carrier packet or not.

The wireless receiver 200 is more reliable for signal detection since the correlators 107 and 111 are more reliable than the signal power detector 105 for detecting weak signals. In general, correlators can detect weak signals because they enhance the desired signal while surpressing noise and interference. Because they enhance the desired signal, a correlator can detect signals that are weaker (lower power) than the noise. Also, the wireless receiver 200 does not include the non-packet processor 117 since packet detection is more reliable and false detections are reduced or otherwise eliminated or otherwise are handled by higher layer protocols (e.g., the MAC). Since the correlation monitor and packet detector 203 and the correlators 107 and 111 are continuously active, power consumption is greater as compared to the wireless receiver 100.

Figure 3:
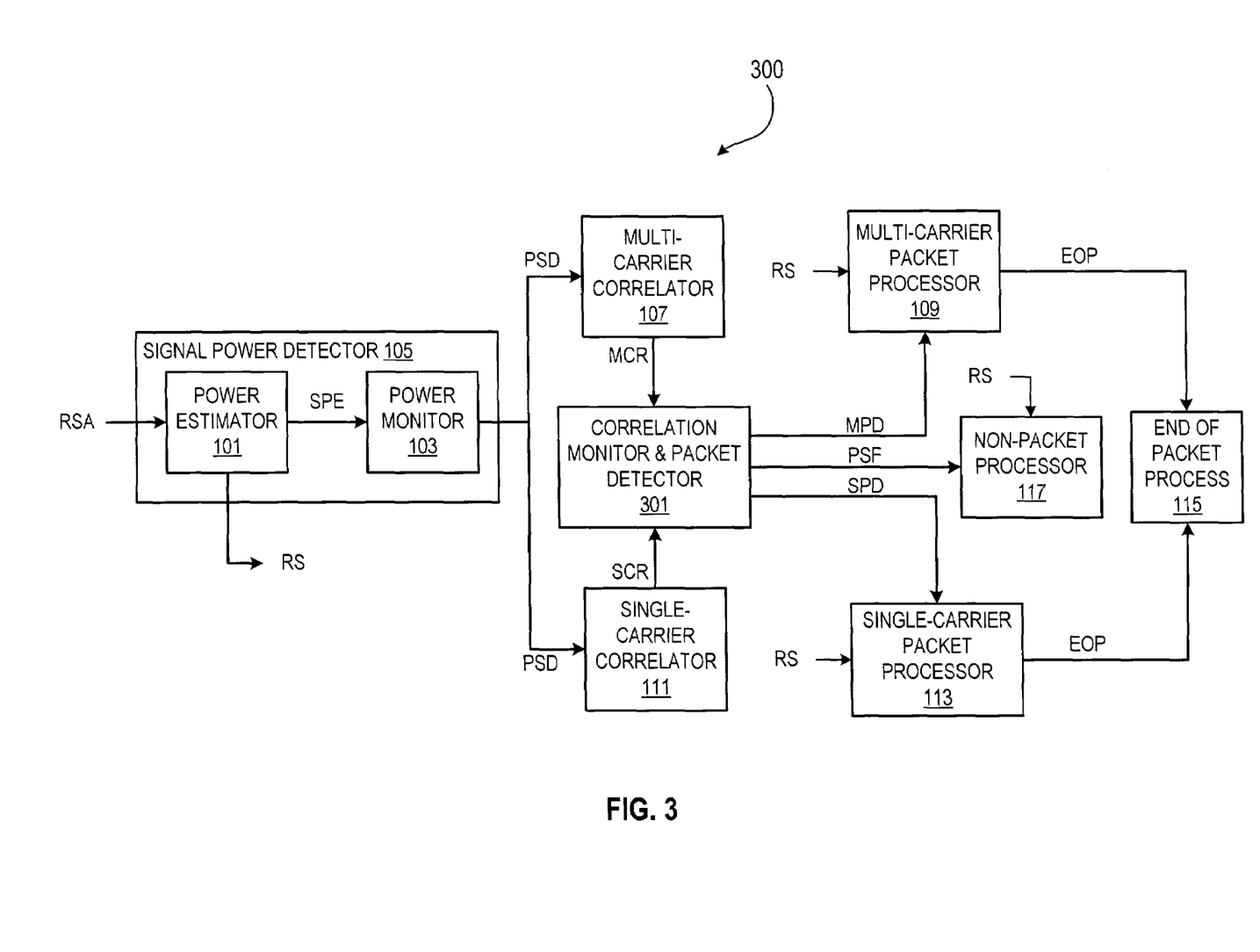
FIG. 3 is a simplified block diagram of a wireless receiver implemented according to yet another embodiment of the present invention including packet detection based on signal power followed by simultaneous correlation.

FIG. 3 is a simplified block diagram of a wireless receiver 300 implemented according to yet another embodiment of the present invention including packet detection based on signal power followed by simultaneous correlation. Again, similar components as the wireless receivers 100 or 200 assume identical reference numerals. The packet processors 109 and 113 and the end of packet process 115 are included and configured in substantially the same manner and are not further described. The wireless receiver 300 includes the signal power detector 105 for monitoring the received signal and initially detecting the possible presence of a packet in a similar manner as described above for the wireless receiver 100. In this case, the PSD signal is provided to both of the correlators 107 and 111, which are coupled in a parallel or simultaneous configuration in a similar manner as the wireless receiver 200. Again, in a lower power configuration, both correlators 107, 111 are configured to remain inactive until assertion of the PSD signal. Upon assertion of the PSD signal by the signal power detector 105, the RS signal is processed by both correlators 107 and 111 for simultaneous correlation. A correlation monitor and packet detector 301 is coupled to both correlators 107 and 111 via MCR and SCR signals, respectively, to process correlation results and determine packet presence and/or packet type in a similar manner as the correlation monitor and packet detector 203. The correlators 107, 111 in the wireless receiver 300 operate in a similar manner as described above for the wireless receiver 200, except that predetermined time-out periods are more likely to be used for both correlators 107, 111 in the event of a non-packet signal. The non-packet processor 117 is coupled to the correlation monitor and packet detector 301 to potentially change the behavior of the wireless receiver 300 in an attempt to reduce false packet detections as previously described. If either one but not both of the correlators 107 or 111 detect a corresponding packet type, then the RS signal is processed by the corresponding packet processor 109 or 113, respectively. If both correlators 107 and 111 detect a packet, then the correlation monitor and packet detector 301 decides which packet processor 109 or 113 to activate, such as based on correlation results or favoring one correlator over the other, etc.

The correlation monitor and packet detector 301 is similar to the correlation monitor and packet detector 203, except that the correlation monitor and packet detector 301 may be implemented with an idle or low-power mode since it only needs to be activated upon assertion of the PSD signal (which may be directly provided). If a packet is not detected, the correlation monitor and packet detector 301 asserts the PSF signal and reverts back to low-power mode. The correlation monitor and packet detector 203, on the other hand, is continuously powered and active since continuously monitoring correlation results to detect a packet.

The wireless receiver 300 provides a lower power solution as compared to the wireless receiver 200 since the correlators 107 and 111 are only activated if the signal power detector 105 detects a possible packet signal. The wireless receiver 300 has a greater power consumption as compared to the wireless receiver 100, however, since once a packet signal is detected by the signal power detector 105, both correlators 107, 111 are activated simultaneously rather than sequentially. Again, since signal detection is made solely by the signal power detector 105, very weak signals might not be detected on the basis of power level alone as described above for the wireless receiver 100.

Figure 4:
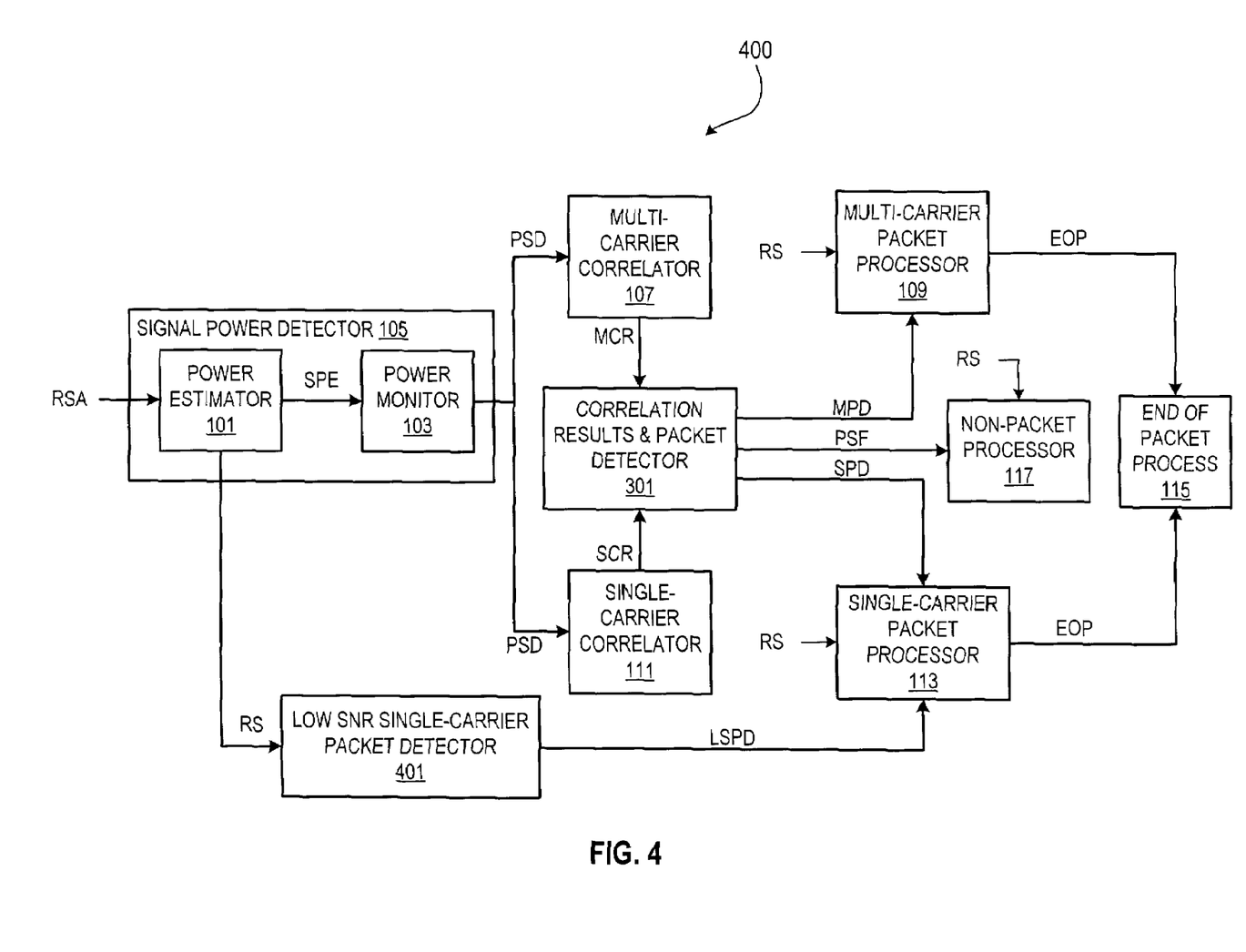
FIG. 4 is a simplified block diagram of a wireless receiver implemented according to still another embodiment of the present invention including multiple packet detectors followed by simultaneous correlation.

FIG. 4 is a simplified block diagram of a wireless receiver 400 implemented according to still another embodiment of the present invention including multiple packet detectors followed by simultaneous correlation. The wireless receiver 400 is similar to the wireless receiver 300 and similar components assume identical reference numbers. The wireless receiver 400 includes an additional low SNR single-carrier packet detector 401 that receives and monitors the RS signal and detects low signal-to-noise ratio (SNR) single-carrier packets (e.g., weak single-carrier packet signals). If the signal power detector 105 detects a possible packet signal, then the low SNR single-carrier packet detector 401 is ignored or otherwise disabled until a new packet search is initiated. If the low SNR single-carrier packet detector 401 detects a low SNR single-carrier signal while the signal power detector 105 does not, then the low SNR single-carrier packet detector 401 asserts an LSPD signal to the single-carrier packet processor 113, which activates a begins processing the RS signal to demodulate the low SNR packet signal. It is possible that the low SNR single-carrier packet detector 401 falsely detects a packet signal, which is determined by the single-carrier packet processor 113 and/or higher layer protocols.

The wireless receiver 400 provides a reasonable power consumption approach and consumes only a slightly higher power level than the wireless receiver 300 since the low SNR single-carrier packet detector 401 remains active. The wireless receiver 400 is more reliable for detecting weak single-carrier packets as compared to the wireless receiver 300. The wireless receiver 400 is not as reliable as compared to the wireless receiver 200 for detecting weak multi-carrier packets signals. In many WLAN configurations, as is understood by those skilled in the art, weak single-carrier packets signals are more common than weak multi-carrier packets signals, so that the wireless receiver 400 provides a reasonable compromise between power consumption and packet detection.

Figure 5:
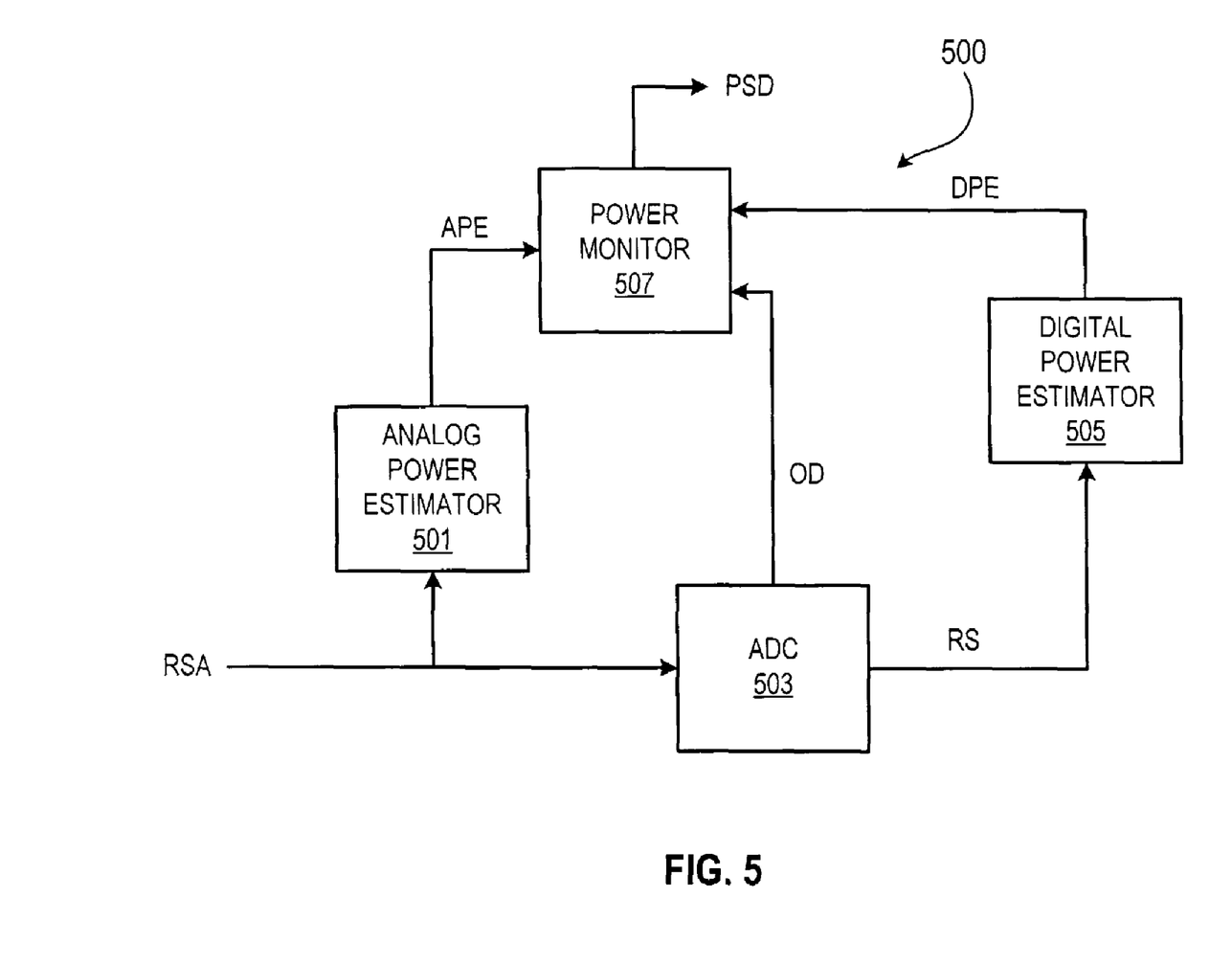
FIG. 5 is a simplified block diagram of an exemplary signal power detector that may be used as the signal power detector of FIG. 1.

FIG. 5 is a simplified block diagram of an exemplary signal power detector 500 that may be used as the signal power detector 105. The signal power detector 500 includes an analog power estimator 501 and the ADC 503 that each receive the RSA signal. The ADC 503 converts the RSA signal to the digital RS signal as previously described. The analog power estimator 501 estimates power of the RSA signal and provides an analog power estimate (APE) to a power monitor 507. The power monitor 507 uses the APE to detect larger power changes. The APE may be used for AGC functions and to scale the receiver front end to reduce the power level of strong signals to an optimal level. The RS signal is provided to a digital power estimator 505, which performs a power estimate of the RS signal and provides a corresponding digital power estimate (DPE) to the power monitor 507. The DPE is used to estimate smaller power level changes of the received signal. The ADC 503 provides an overload indication to the power monitor 507, such as, for example, a ratio or relative count of the number of times the ADC 503 clips the signal. The power monitor 507 may use the overload indication to make appropriate adjustments to AGC and front end scaling. The power monitor 507 uses the APE, DPE and overload indication inputs to make an initial determination as to whether the RS signal contains a packet, and asserts the PSD signal as previously described. The power estimator 101 generally represents the analog power estimator 501, the digital power estimator 505 and the ADC 503 and the power monitor 507 represents the power monitor 103 of the signal power detector 105.

Figure 6:
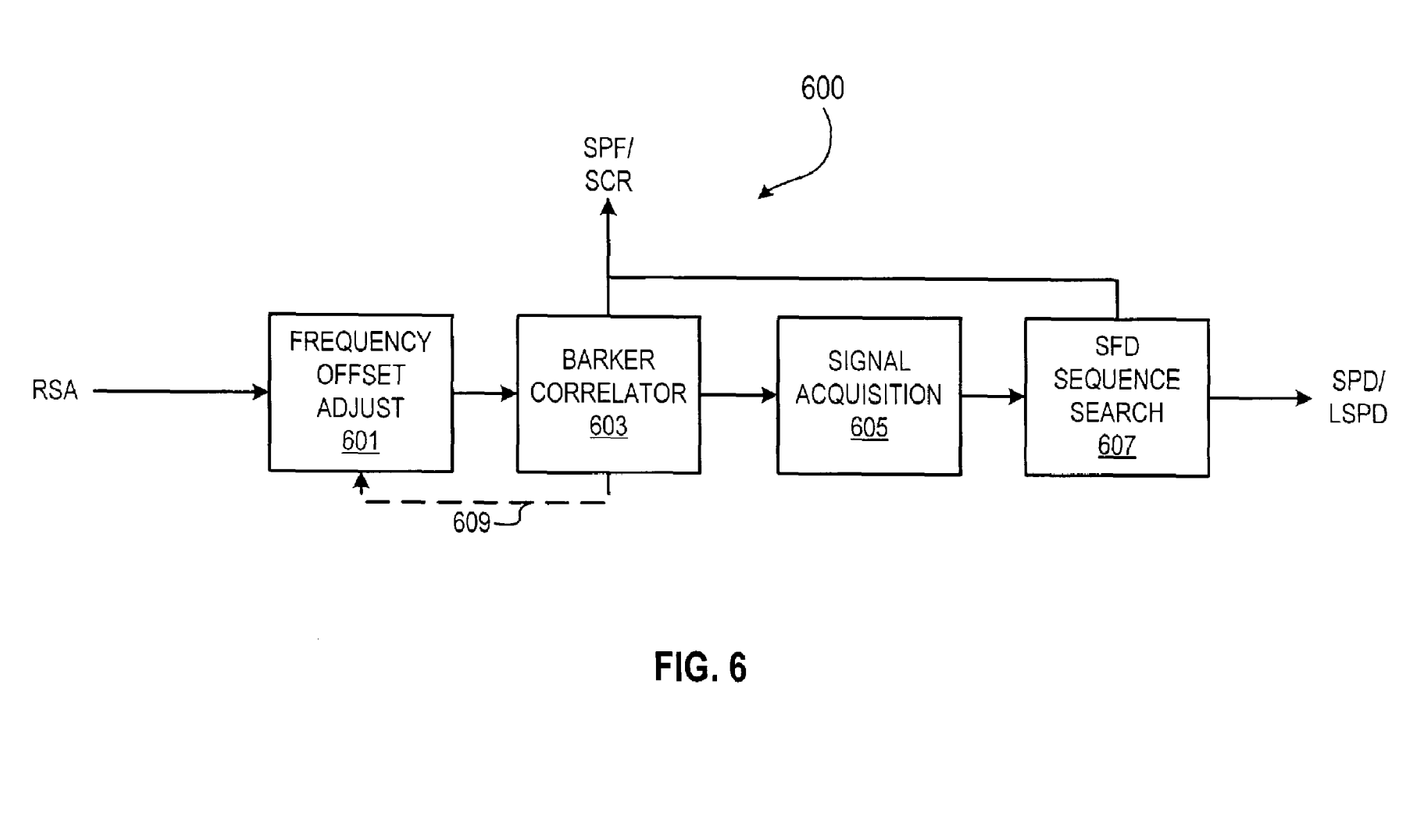
FIG. 6 is a simplified block diagram of an exemplary embodiment of the single-carrier packet correlator of FIGS. 1-4 which may be used to correlate for and detect 802.11b-type packets, and which may also be used as the low SNR single-carrier packet detector of FIG. 4.

FIG. 6 is a simplified block diagram of an exemplary embodiment of a single-carrier correlator 600 that may be used to correlate for and detect 802.11b-type packets. The single-carrier correlator 600 may be used as the single-carrier correlator 111 but only if 802.11b-type packets are expected. The RS signal is provided to a frequency offset adjust block 601, which removes any frequency offset present in the signal due to differences between oscillator frequencies causing rotation of the digital signal. The frequency corrected signal is then provided to a Barker correlation block 603, which performs Barker correlation with the modulation removed to initially qualify the RS signal as possibly containing an 802.11b-type packet having a preamble comprising Barker words. It is noted that one method of frequency offset estimation uses the outputs of the Barker correlation block 603, as shown by dashed signal lines 609 providing a feedback path to the frequency offset adjust block 601. The correlation results are compared to a predetermined correlation threshold, and if the threshold is met, the RS signal is provided to a signal acquisition block 605. If the threshold is not met, the SPF signal is asserted indicating packet detect failure. The signal acquisition block 605 acquires signal parameters, such as, for example, channel estimates, signal timing, carrier offset, etc. After signal acquisition is completed by the signal acquisition block 605, the RS signal is forwarded to an SFD sequence search block 607 to search for the SFD sequence. If the SFD sequence search block 607 does not detect the SFD sequence, then the RS signal is determined not to contain a single-carrier packet and the SPF signal is asserted. The determination may be performed using a predetermined period of search time, so that if the SFD sequence is not found within the search time, a time-out results indicating failure. If the SFD sequence is found, then the RS signal is determined to contain a single-carrier packet and the SPD signal is asserted. The combined results of the Barker correlation block 603 and the SFD sequence search block 607 may be used to develop the SCR signals used for correlation monitoring and packet detection, such as by blocks 203 or 301 previously described.

The single-carrier correlator 600 may be used as the low SNR single-carrier packet detector 401 for 802.11b-type packets. The signal acquisition block 605 performs similar functions when used as a low SNR packet detector, except that the channel estimate determination is optional. This is relatively inconsequential since for low-SNR, single-carrier packet signals, the channel estimate is likely to be inaccurate. If the SFD sequence is found, then the RS signal is determined to contain a single-carrier packet and the LSPD signal is asserted.

Although the present invention has been described in detail with reference to certain embodiments including preferred versions thereof, other versions and variations are possible and contemplated. The present invention is intended to cover such alternatives, modifications, and equivalents, as can be reasonably included within the spirit and scope of the invention. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A wireless receiver for sorting packets, comprising a multi-carrier correlator that correlates a received signal according to characteristics of a multi-carrier signal; a multi-carrier packet processor, coupled to said multi-carrier correlator, that processes said received signal if said multi-carrier correlator indicates a multi-carrier packet; a single-carrier correlator that correlates said received signal according to characteristics of a single-carrier signal; and a single-carrier packet processor, coupled to said single-carrier correlator, that processes said received signal if said single-carrier correlator indicates a single-carrier packet, further comprising: a signal power detector that monitors power level of said received signal and that provides a packet detect signal indicative of a possible packet.

2. The wireless receiver of claim 1, wherein said signal power detector comprises: a power estimator that estimates a power level of said received signal; and a power monitor, coupled to said power estimator, that indicates a possible packet signal if said power level exceeds a predetermined threshold.

3. The wireless receiver of claim 1, wherein said signal power detector comprises: an analog power estimator that receives said received signal in analog format and that provides an analog power estimation; a digital power estimator that receives said received signal in digital format and that provides a digital power estimation; and a power monitor, coupled to said analog and digital power estimators, that indicates a possible packet signal if either of said analog and digital power estimations indicate a possible packet.

4. The wireless receiver of claim 1, further comprising: a non-packet processor that determines whether at least one power level threshold should be adjusted if the received signal does not include a packet.

5. The wireless receiver of claim 1, wherein: said multi-carrier correlator, coupled to said signal power detector, correlating said received signal if said packet detect signal indicates a possible packet signal, said multi-carrier correlator further determining whether said received signal includes a multi-carrier packet and providing a multi-carrier packet detect signal indicative thereof; and said single-carrier correlator, coupled to said multi-carrier correlator, correlating said received signal if said multi-carrier packet detect signal indicates that said received signal does not include a multi-carrier packet, said single-carrier correlator further determining whether said received signal includes a single-carrier packet and providing a single-carrier packet detect signal indicative thereof.

6. The wireless receiver of claim 1, further comprising: said single-carrier and multi-carrier correlators configured to simultaneously correlate said received signal if said packet detect signal indicates a possible packet signal; and a correlation monitor, coupled to said single-carrier and multi-carrier correlators, that determines whether said received signal includes a single-carrier packet or a multi-carrier packet based on correlation results.

7. The wireless receiver of claim 6, further comprising: said correlation monitor providing a packet detect fail signal if a packet is not detected in said received signal; and a non-packet processor that determines whether at least one power level threshold should be adjusted if said packet detect fail signal is provided.

8. The wireless receiver of claim 6, further comprising: a low signal to noise ratio (SNR) single-carrier packet detector, coupled to said single-carrier processor, that monitors said received signal for low SNR single-carrier packets.

9. The wireless receiver of claim 8, wherein said low SNR single-carrier packet detector comprises: frequency offset adjust logic; a Barker correlator coupled to said frequency offset adjust logic; signal acquisition logic coupled to said Barker correlator; and SFD sequence search logic coupled to said signal acquisition logic.

10. A wireless receiver that sorts packets in a received signal, comprising:
at least one packet detector that detects whether the received signal possibly contains a packet; a plurality of correlators, each correlating the received signal according to a corresponding one of a plurality of packet types; and
a plurality of packet processors, each coupled to a corresponding one of said plurality of correlators, that each process the received signal according to one of said plurality of packet types, wherein said at least one packet detector comprises a signal power detector;
said plurality of correlators configured for simultaneous correlation; and
said at least one packet detector comprising a correlation monitor, coupled to said plurality of correlators, that continuously monitors correlation results to determine and indicate the presence of a packet.

* * * * *